No. 774,755. PATENTED NOV. 15, 1904.
L. C. HUSE.
TAKE-UP MECHANISM FOR KNITTING MACHINES.
APPLICATION FILED JUNE 2, 1904.
NO MODEL.
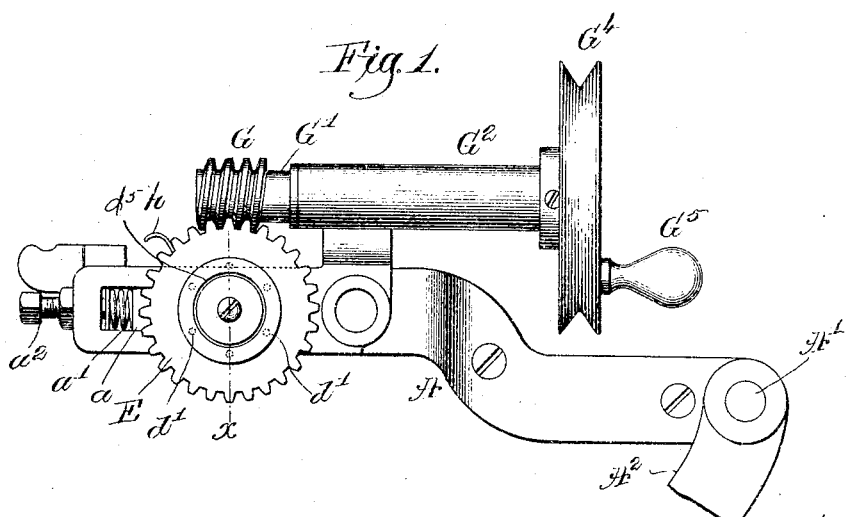
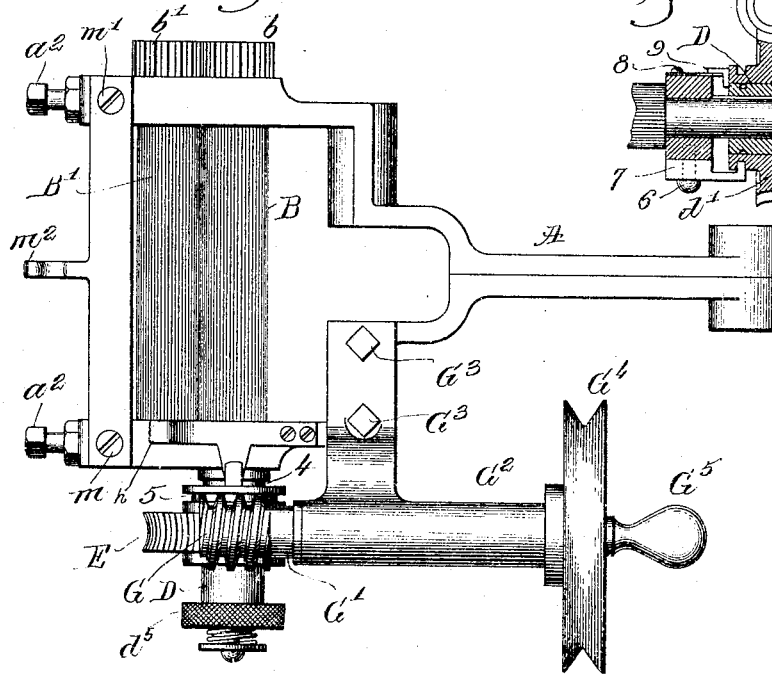
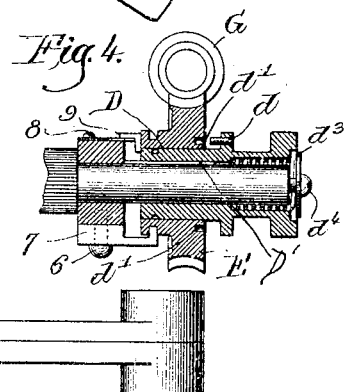
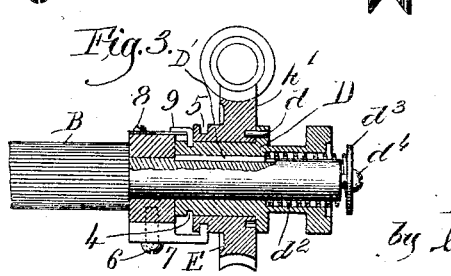
Witnesses.
Thomas J. Drummond
S. Wm. Luttons
Inventor.
Leon C. Huse,
by Crosby Gregory Attys.

No. 774,755. Patented November 15, 1904.

UNITED STATES PATENT OFFICE.

LEON C. HUSE, OF LACONIA, NEW HAMPSHIRE, ASSIGNOR OF TWO-THIRDS TO WARREN D. AND WALTER L. HUSE, OF LACONIA, NEW HAMPSHIRE.

TAKE-UP MECHANISM FOR KNITTING-MACHINES.

SPECIFICATION forming part of Letters Patent No. 774,755, dated November 15, 1904.

Application filed June 2, 1904. Serial No. 210,796. (No model.)

*To all whom it may concern:*

Be it known that I, LEON C. HUSE, a citizen of the United States, residing at Laconia, in the county of Belknap and State of New Hampshire, have invented an Improvement in Take-Up Mechanism for Knitting-Machines, of which the following description, in connection with the accompanying drawings, is a specification, like characters on the drawings representing like parts.

This invention has for its object the production of a novel and simple take-up mechanism of durable construction, the rolls being capable of being run rapidly irrespective of their driving means when it is desired to pull quickly between said rolls a portion of the knitted web.

Figure 1, in side elevation, represents my improved take-up; Fig. 2, a plan view thereof. Fig. 3 is a partial section in the line $x$, Fig. 1, showing the clutch-hub in engagement with the worm-wheel; and Fig. 4 is a like view with the clutch-hub disengaged from the worm-gear.

The yoke A, carrying the take-up rolls B B', is pivoted on a stud A' of a standard $A^2$. The journals of the take-up rolls enter spaces in the side frames of the yoke, and the journal of the roller B' is acted upon by a cap $a$, the latter being acted upon by a spring $a'$, the stress of which is controlled by an adjusting device, shown as a screw $a^2$.

The take-up rollers at one end have respectively toothed gears $b$ $b'$, the gear $b$ driving the gear $b'$ and the roller B'. One journal of the roll B is prolonged beyond the side of the yoke (see Figs. 3 and 4) and has a spline D', that engages a groove in a slidable clutch-hub D, provided, as shown, with a pin $d$, that is adapted to enter any one of a series of holes $d'$ in a worm-gear E, surrounding said hub loosely. The outer end of the hub is provided with a chamber that receives a spiral spring $d^2$, the outer end of which is acted upon by a washer $d^3$, secured to the end of the journal of the roller B by, as shown, a set-screw $b^4$. The outer end of the clutch-hub is enlarged and milled, as at $d^5$, so that the hub may be turned by hand after the withdrawal of the pin $d$ from the hole $d'$ of the worm-toothed gear E, and at such time the rollers B B' may be turned by hand, or the rollers are free to be revolved as the fabric between the rolls is pulled. The clutch-hub has a groove 4, and the hub of the worm-toothed gear has a groove 5.

The under side of the yoke A has connected therewith by a screw 6 a yoke 7, that enters the groove 5 and prevents longitudinal movement of the worm-toothed gear with relation to the journal of the take-up roller B. The upper side of the yoke has connected therewith by a screw 8 a finger 9, that enters the annular groove 4 of the clutch-hub when the same is in its operative position, as shown in Fig. 3.

The worm-toothed gear when connected with the clutch-hub is rotated, as when the knitting is being produced and the knitted web is being taken up between the rollers B and B', by or through a worm G on a shaft G', free to rotate in a sleeve-bearing $G^2$, connected to the yoke by set-screws $G^3$, said shaft having a belt-wheel $G^4$, that in practice will receive a belt driven from any going part of the machine. The belt-wheel is also represented as provided with a handle $G^5$, by which it may be turned when desired.

When the clutch-hub engages the worm-toothed wheel, as represented in Figs. 1, 2, and 3, and the shaft G' is rotated, the take-up rollers will operate on the web in usual manner.

Whenever it is desired to pull the web quickly through between the rollers, it is only necessary to engage the extremity $h$ of the finger 9 by hand or with a screw-driver and lift the same out of the annular groove 4, when the operator may engage the end $d^5$ of the clutch-hub and draw it to the right from the position Fig. 3 into the position Fig. 4, such position of the clutch-hub leaving the rollers B and B' free to be moved freely, as when drawing the work by hand between the rollers, and also, if desired, when in such condition the operator may rotate the roller B by turning the clutch-hub splined on the extended journal of said roller and manipulate the take-up and fabric to bring them in proper relation.

The yoke has connected with it by screws $m$ a bar $m'$, from which is extended a hook $m^2$, upon which will be hung the usual weight to hold the knitted web taut during the take-up of the web.

Having described my invention, what I claim as new, and desire to secure by Letters Patent, is—

1. In a take-up, a yoke having a pair of take-up rolls, spur-gears uniting said rolls at one end, a clutch-hub splined on an extension of one of said rolls, a worm-toothed gear surrounding said clutch-hub, means to restrain said worm-toothed gear from movement longitudinally of said hub, said hub and worm-toothed gear being provided with means to couple them together, and means to rotate said worm-toothed gear and through it turn said clutch-hub and rotate said take-up rollers.

2. In a take-up, a yoke, a pair of take-up rolls thereon, gears between said rolls to cause the same to be rotated in unison, one of said rolls having an extended journal, a clutch-hub splined on said extension and provided at one end with an annular groove, a worm-toothed gear mounted loosely on said hub, coupling means to unite said hub and gear, means to rotate said worm-toothed gear to turn said hub and the roller on which it is splined, and a device coacting with the groove of said hub to prevent longitudinal movement thereof.

3. In a take-up, a yoke having a pair of take-up rolls, spur-gears uniting said rolls at one end, a clutch-hub splined on an extension of one of said rolls, a worm-toothed gear surrounding said clutch-hub, means to restrain said worm-toothed gear from movement longitudinally of said hub, said hub and worm-toothed gear being provided with means to couple them together, means to rotate said worm-toothed gear and through it turn said clutch-hub and rotate said take-up rollers, and means to restrain said hub from movement longitudinally of said extension.

4. In a take-up, a take-up roll having an extended journal, a clutch-hub splined thereon and containing a spring, a worm-toothed gear surrounding said hub loosely, means to restrain longitudinal movement of said gear on said hub, coupling means intermediate said hub and gear and normally kept in engagement by said spring and means to rotate said gear.

In testimony whereof I have signed my name to this specification in the presence of two subscribing witnesses.

LEON C. HUSE.

Witnesses:
GEO. P. MUNSEY,
BLANCHE TETLEY.